(12) United States Patent
Belkin et al.

(10) Patent No.: US 10,569,691 B1
(45) Date of Patent: Feb. 25, 2020

(54) COVER FOR LASHING BAR SOCKET

(71) Applicant: Peck & Hale, L.L.C., West Sayville, NY (US)

(72) Inventors: Richard Belkin, Bay Shore, NY (US); John L. Szeglin, Sayville, NY (US)

(73) Assignee: Peck & Hale, L.L.C., West Sayville, NY (US)

( * ) Notice: Subject to any disclaimer, the term of this patent is extended or adjusted under 35 U.S.C. 154(b) by 224 days.

(21) Appl. No.: 15/840,277

(22) Filed: Dec. 13, 2017

Related U.S. Application Data

(60) Provisional application No. 62/433,299, filed on Dec. 13, 2016.

(51) Int. Cl.
*B60P 7/08* (2006.01)

(52) U.S. Cl.
CPC ................... *B60P 7/0807* (2013.01)

(58) Field of Classification Search
CPC ..... B60P 7/0807; B61D 45/00; B61D 45/001; B63B 25/24
USPC ........................................................ 410/112
See application file for complete search history.

(56) References Cited

U.S. PATENT DOCUMENTS

| | | | |
|---|---|---|---|
| 3,927,623 A | 12/1975 | Caron | |
| 4,762,449 A * | 8/1988 | St. Pierre | B60P 7/0807 248/499 |
| 4,877,361 A | 10/1989 | DeRosa et al. | |
| 9,340,142 B1 | 5/2016 | Belkin et al. | |

OTHER PUBLICATIONS https://www.rogerscorp.com/ems/poron/industrial/index.aspx (Year: 2019).*
https://www.rogerscorp.com/ems/poron/index.aspx (Year: 2019).*
https://americanflexible.com/poron/ (Year: 2019).*
Drawing, Cover Assembly for Cloverleaf Vehicle & Helicopter Deck Fittings, 1966.

* cited by examiner

*Primary Examiner* — Hilary L Gutman
(74) *Attorney, Agent, or Firm* — Schroeder Law PC

(57) ABSTRACT

A cover assembly for a cargo lashing fitting having a substantially planar cover plate which can be readily installed/uninstalled to and from the fitting, which connects to the fitting in an impact-resistant manner, which can resist the forces incurred when subjected to loading from on-deck vehicles and equipment, and which provides a long lasting watertight seal of the socket cavity.

16 Claims, 6 Drawing Sheets

COVER FOR LASHING BAR SOCKET

BACKGROUND OF THE INVENTION

The present invention relates to the transportation of cargo and, more particularly, to covers for the cargo lashing fittings that are affixed to the deck of a transportation vehicle.

The transportation of cargo requires securing systems and devices that ensure that such cargo remains safely stowed and stationary during transit. In this regard, the deck of the transportation vehicle, e.g., a ship, railcar, etc, typically includes a plurality of cargo lashing fittings, often referred to as lashing sockets. Common designs of lashing sockets include cloverleaf-type lashing sockets and crossbar-type lashing sockets. A tiedown assembly, or other such lashing gear, is then installed between an attachment point on the item of cargo and the lashing socket installed in the deck of the vehicle, thereby ensuring that the cargo remains stationary during transport.

It will be recognized by those skilled in the art that lashing sockets provide an open cavity for collection of water and debris. Moreover, in particular applications, an open cavity on the deck of the vehicle may be undesirable. Attempts have been made to provide covers for such lashing sockets, but these prior art covers have been unable to resist ingress of moisture/water and/or have been unable to resist inadvertent removal upon impact or exposure to harsh conditions, including wind and/or high velocity air flow. Other prior art covers have included non-planar cover plates, which tend to collect water/debris thereon, and which may hinder movement of equipment/persons across the surface of the deck when such cover is installed.

There is therefore a need in the art for a cover for a cargo lashing fitting which can be readily installed/uninstalled to and from the fitting, which connects to the fitting in an impact-resistant manner, which can resist the forces incurred when subjected to loading from on-deck vehicles and equipment, which provides a long lasting watertight seal of the socket cavity, and which provides a substantially planar cover plate.

SUMMARY OF THE INVENTION

The present invention, which addresses the needs of the prior art, provides a cover assembly for a cargo lashing fitting. The cover assembly includes a substantially planar cover plate having an inner surface and an outer surface, the inner surface defining an inner side and the outer surface defining an outer side, the inner surface of the plate including an elongated notch, the notch including a central receiving portion, the notch further including first and second receiving portions located on opposing sides of the central receiving portion. The cover assembly further includes a slide block positioned within the central receiving portion of the notch and movable between an unlocking position and a locking position, the slide block including first and second opposing attachment points, the first attachment point oriented toward the first receiving portion, the second attachment point oriented toward the second receiving portion. The cover assembly further including first and second clamping arms located on the inner side of the cover plate, the first clamping arm including an attachment head positioned within the first receiving portion and pivotably connected to the first attachment point, the second clamping arm including an attachment head positioned within the second receiving portion and pivotably connected to the second attachment point, each of the clamping arms being rotatable between an open position which allows location of the cover plate on the fitting and a closed position which secures the cover plate to the fitting. Finally, the cover assembly includes at least one turning head located on the outer side of the cover plate, the at least one turning head mechanically communicating with the slide block to move the slide block within the elongated notch in a direction perpendicular to the cover plate between the unlocking position and the locking position thereby rotating said clamping arms between the open position and the closed position.

The present invention further relates to a combination of a cargo lashing fitting and a cover assembly. The cover assembly includes a substantially planar cover plate having an inner surface and an outer surface, the inner surface defining an inner side and the outer surface defining an outer side, the inner surface of the plate including an elongated notch, the notch including a central receiving portion, the notch further including first and second receiving portions located on opposing sides of the central receiving portion. The cover assembly further includes a slide block positioned within the central receiving portion of the notch and movable between an unlocking position and a locking position, the slide block including first and second opposing attachment points, the first attachment point oriented toward the first receiving portion, the second attachment point oriented toward the second receiving portion. The cover assembly further including first and second clamping arms located on the inner side of the cover plate, the first clamping arm including an attachment head positioned within the first receiving portion and pivotably connected to the first attachment point, the second clamping arm including an attachment head positioned within the second receiving portion and pivotably connected to the second attachment point, each of the clamping arms being rotatable between an open position which allows location of the cover plate on the fitting and a closed position which secures the cover plate to the fitting. Finally, the cover assembly includes at least one turning head located on the outer side of the cover plate, the at least one turning head mechanically communicating with the slide block to move the slide block within the elongated notch in a direction perpendicular to the cover plate between the unlocking position and the locking position thereby rotating said clamping arms between the open position and the closed position.

As a result, the present invention provides a cover assembly for a cargo lashing fitting having a substantially planar cover plate which can be readily installed/uninstalled to and from the fitting, which connects to the fitting in an impact-resistant manner, which can resist the forces incurred when subjected to loading from on-deck vehicles and equipment, and which provides a long lasting watertight seal of the socket cavity.

DETAILED DESCRIPTION OF THE INVENTION

Figure 1:
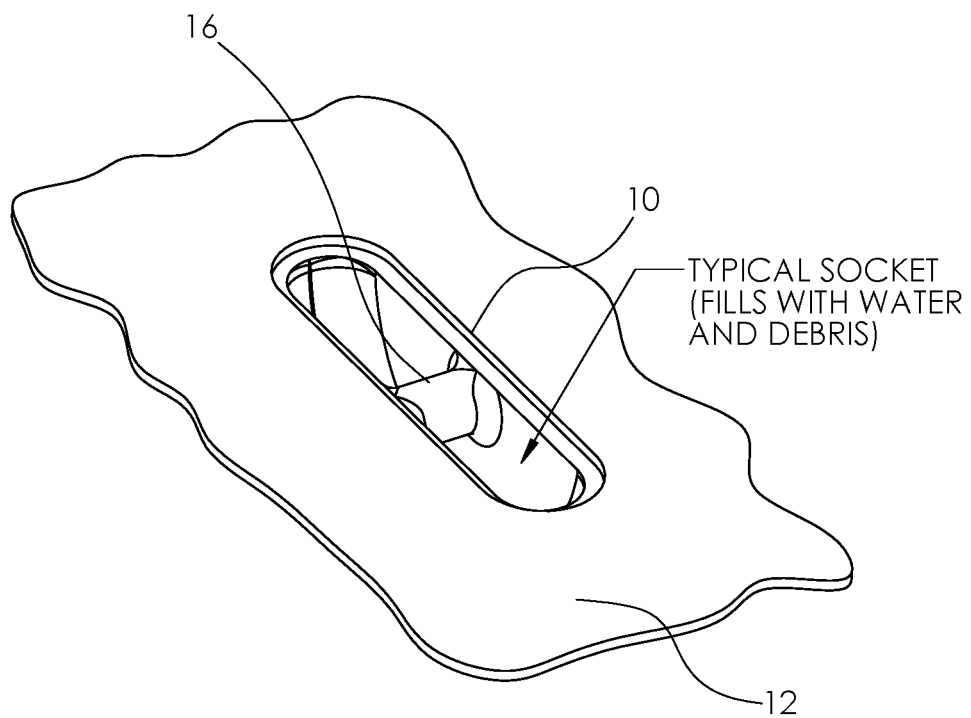
FIG. 1 is a perspective view of a typical crossbar lashing bar socket installed in the deck of a vessel.

FIG. 1 shows a typical lashing bar socket 10 installed in a deck 12 of a vessel. Socket 10 includes a crossbar 16. When left exposed to the environment, socket 10 will fill with water and debris (as seen in FIG. 1), which hinders the subsequent usage of such socket for lashing applications.

Figure 2:
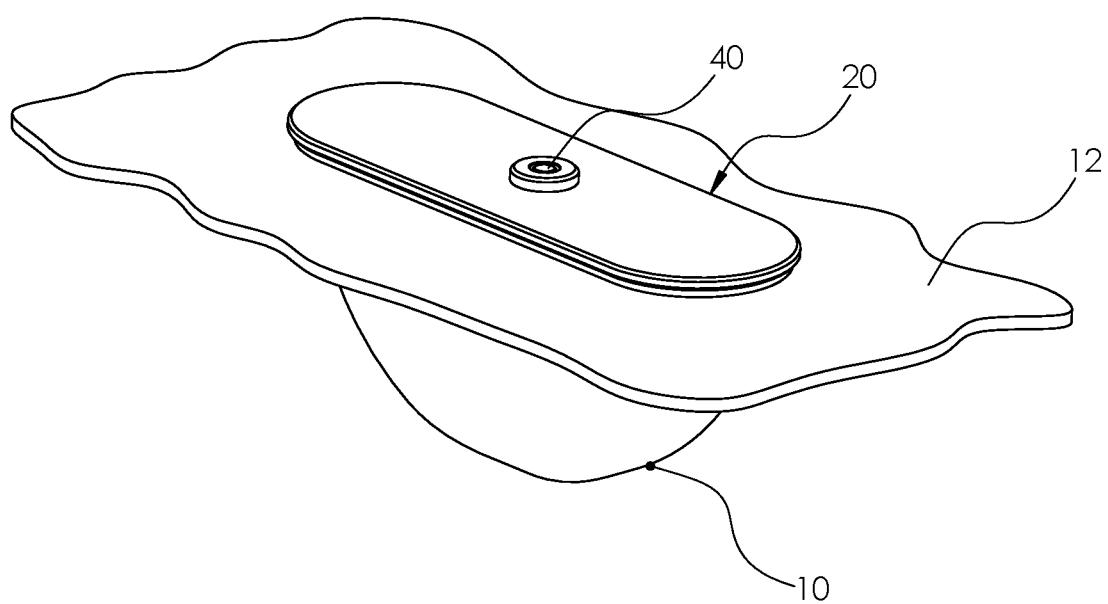
FIG. 2 is a perspective view showing the cover assembly of the present invention secured to the crossbar lashing socket of FIG. 1.

A novel cover, i.e., cover assembly 20, is disclosed and described herein, and is shown secured to socket 10 in FIG. 2. Cover assembly 20 is readily secured and removed from socket 10, and provides a sealing connection with deck 12 about the periphery of socket 10 such that water and debris does not enter socket 10 when cover assembly 20 is installed.

Figure 3:
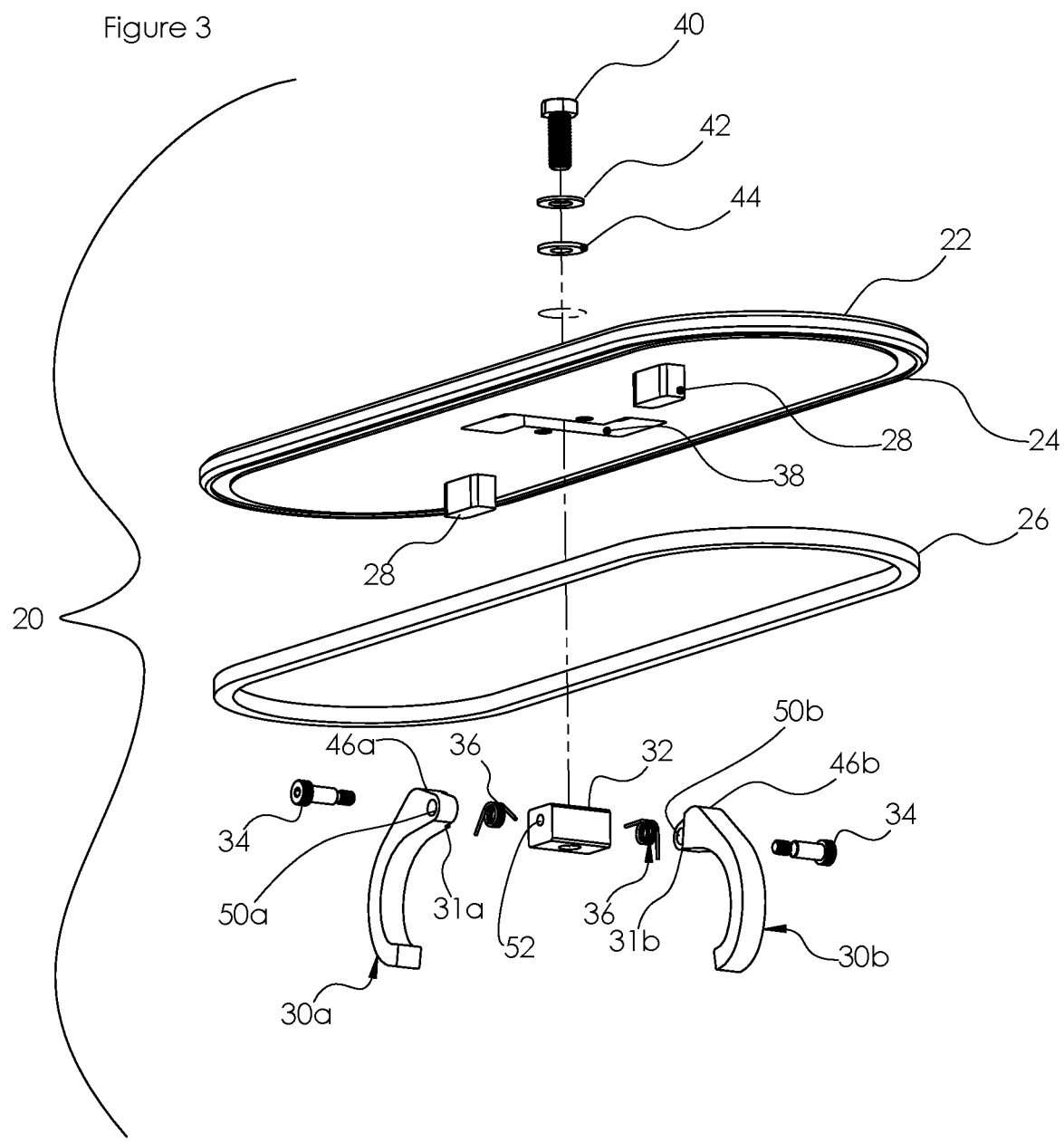
FIG. 3 in as exploded perspective view of the cover assembly of FIG. 2.

Referring now to FIG. 3, cover assembly 20 includes a plate 22 having the same general configuration as the opening of socket 10, and which is sized to overlap the edges of socket 10 about the periphery thereof. In one preferred embodiment, plate 22 is formed of aluminum. The lower surface of plate 22 includes a groove 24 extending about the periphery thereof for receipt of a seal 26 therein. In one embodiment, seal 26 is formed of Poron (urethane). Thus, when plate 22 is located over socket 10, seal 26 contacts deck 12 about the periphery of socket 10, thereby forming a watertight seal around the entire periphery of socket 10.

In one preferred embodiment, plate 22 includes a pair of anti-rotation tabs 28. Tabs 28 extend downward from the lower surface of plate 22, and are located to contact the inner edges of socket 10 (on opposing sides and ends of socket 10), thereby preventing plate 22 from rotating about socket 10 while being secured thereto. Of course, the size, number, configuration and positioning of tabs 28 can be varied as needed.

Cover assembly 20 further includes a pair of clamps, i.e, clamping arms 30a, 30b, and a slide block 32. In one embodiment, clamping arms 30a, 30b are formed with a generally arcuate configuration, and include attachment heads 31a, 31b. Attachment heads 31a, 31b are pivotably attached to slide block 32 via pins 34. Pins 34 preferably extend through apertures 50a, 50b formed in attachment heads 31a, 31b, respectively, and are received within threaded apertures 52 of slide block 32. A spring 36 cooperates with each of the clamping arms to bias the clamping arms away from one another, and to an open installation position (see FIG. 5).

Figure 4:
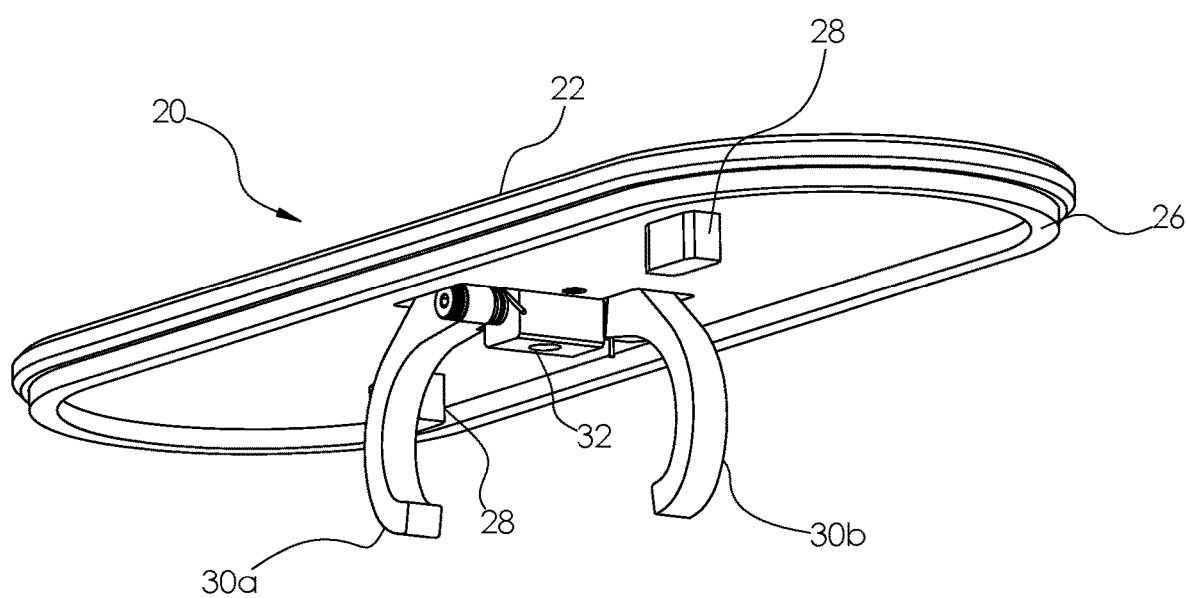
FIG. 4 is a bottom perspective view of the cover plate of the cover assembly of FIG. 2.

Plate 22 includes an elongated notch 38 formed in its lower surface. In one preferred embodiment, notch 38 includes a central receiving portion, and first and second receiving portions located on opposing sides of the central receiving portion. In a still further embodiment, notch 38 is formed with a Z-shaped configuration, and the central receiving portion communicates with the first and second receiving portions. The central receiving portion of notch 38 is sized to receive slide block 32 (see FIG. 4), while the side receiving portions of notch 38 are sized to receive the attachment heads of clamping arms 30a, 30b. In one preferred embodiment, the receiving portions of the notch are formed with a rectangular shape. A bolt 40 extends through plate 22 into threading engagement with slide block 32, thereby retaining slide block 32, as well as clamping arms 30a, 30b, within notch 38. In one preferred embodiment, a washer 42 and an O-ring 44 are installed about bolt 40. Bolt 40 preferably includes a turning head which is accessible from the outer side of plate 22 and which allows both clockwise and counterclockwise rotation of bolt 40.

Figure 5:
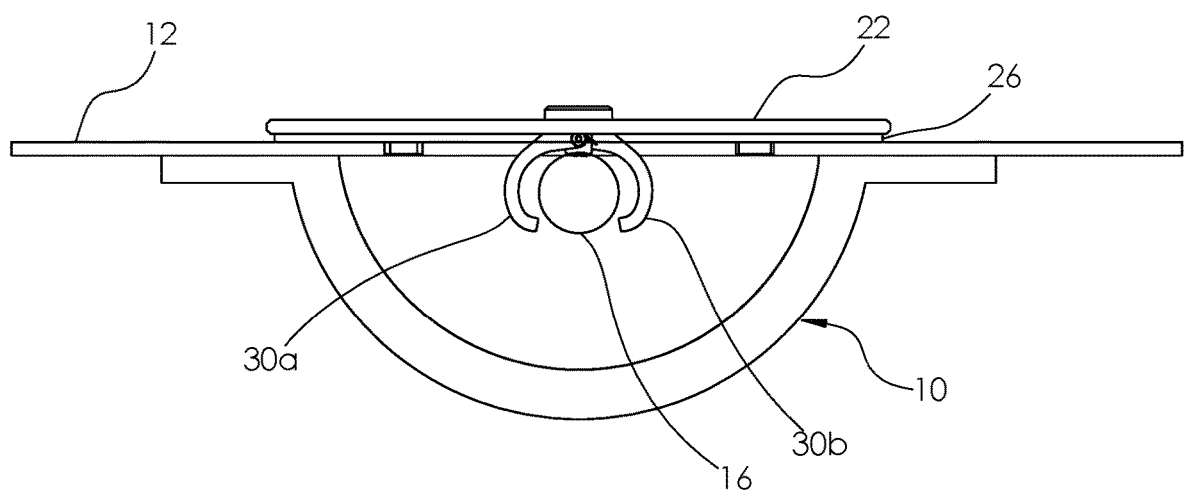
FIG. 5 is an elevation view of the cover assembly of FIG. 2 showing the clamping arms in the open position.
Figure 6:
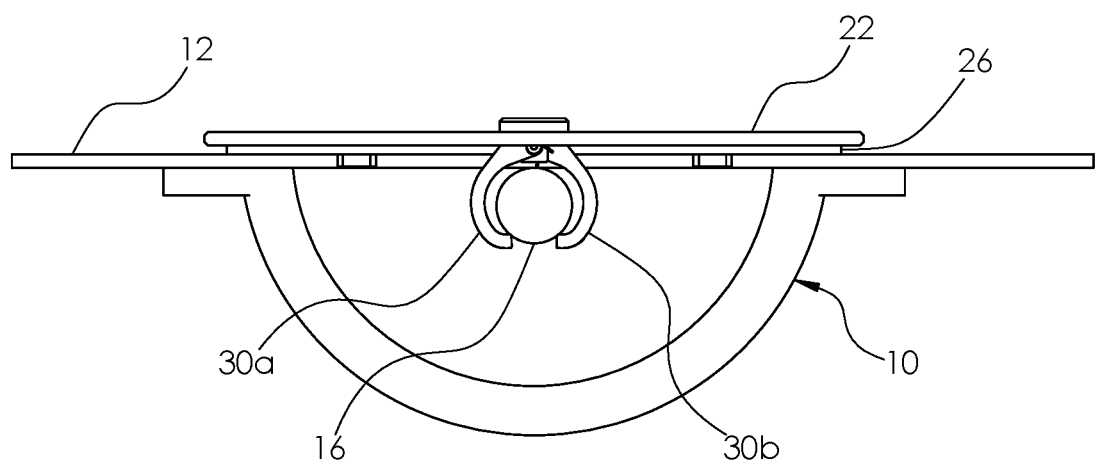
FIG. 6 is an elevation view of the cover assembly of FIG. 2 showing the clamping arms in the closed position.

The operation of cover assembly 20 is explained with reference to FIGS. 5 to 6. Turning first to FIG. 5, clamping arms 30a, 30b are normally in an open installation position (due to the biasing of springs 36) when the cover assembly is not in use. Thus, cover assembly 20 can be placed over socket 10 such that clamping arms 30a, 30b pass over crossbar 16 (see FIG. 5). At this point, seal 24 is in contact with deck 12 about the periphery of socket 10.

To secure cover assembly 20 to deck 12, the operator rotates bolt 40 a predetermined number of rotations (via a socket wrench or other tool). Referring back to FIG. 4, it will be appreciated that the turning of bolt 40 will cause slide block 32 to move within notch 38, and in a direction towards plate 22. At the same time, the attachment heads of clamping arms 30a, 30b will also be drawn into notch 38. As clamping arms 30a, 30b are drawn into notch 38, the outer surfaces 46a, 46b of attachment heads 50a, 50b, respectively, will contact the edges of notch 38, thereby causing clamping arms 30a, 30b to rotate towards one another to the closed position. As shown in FIG. 6, this rotation of clamping arms 30a, 30b towards one another results in the locking of such clamping arms about crossbar 16. This both secures cover assembly 20 to socket 10, and also draws seal 24 into sealing contact with deck 14 about the periphery of socket 10.

To remove cover assembly 20 from socket 10, the installer rotates bolt 40 in the opposite direction, thereby causing slide block 32 to move within notch 38 and in a direction away from plate 22. As the slide block moves away from plate 22, the attachment heads also move away from plate 22. Once the outer surfaces 46a, 46b of attachment heads 50a, 50b move out of contact with the edges of notch 38, the biasing effect of springs 36 will cause clamping arms 30a, 30b to rotate to the open position. Once clamping arms 30a, 30b have rotated to the open position, cover 20 can be removed from socket 10.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendments and/or deviations be included in the scope of the present invention.

What is claimed is:

1. A cover assembly for a cargo lashing fitting, comprising:
   a substantially planar cover plate having an inner surface and an outer surface, said inner surface defining an inner side and said outer surface defining an outer side, said inner surface of said plate including an elongated notch, said notch including a central receiving portion, said notch further including first and second receiving portions located on opposing sides of said central receiving portion;
   a slide block positioned within said central receiving portion of said notch and movable between an unlocking position and a locking position, said slide block including first and second opposing attachment points, said first attachment point oriented toward said first receiving portion, said second attachment point oriented toward said second receiving portion;
   first and second clamping arms located on said inner side of said cover plate, said first clamping arm including an attachment head positioned within said first receiving portion and pivotably connected to said first attachment point, said second clamping arm including an attachment head positioned within said second receiving portion and pivotably connected to said second attachment point, each of said clamping arms being rotatable between an open position which allows location of said cover plate on said fitting and a closed position which secures said cover plate to said fitting; and at least one turning head located on said outer side of said cover plate, said at least one turning head mechanically communicating with said slide block to move said slide block within said elongated notch in a direction perpendicular to said cover plate between said unlocking position and said locking position thereby rotating said clamping arms between said open position and said closed position.

2. The cover assembly according to claim 1, further comprising first and second biasing springs, said first biasing spring cooperating with said first clamping arm to rotate said first clamping arm to said open position when said slide block is in said unlocking position, said second biasing spring cooperating with said second clamping arm to rotate said second clamping arm to said open position when said slide block is in said unlocking position.

3. The cover assembly according to claim 2, wherein said first attachment point includes an aperture positioned within a first side of said slide block, and said second attachment point includes an aperture positioned within a second side of said slide block, and further comprising:

a first pin for rotably securing said attachment head of said first clamping arm to said first side of said slide block; and a second pin for rotably securing said attachment head of second clamping arm to said second side of said slide block.

4. The cover assembly according to claim 2, wherein said first attachment point includes a first pin extending from a first side of said slide block, and said second attachment point includes a second pin extending from a second side of said slide block, and wherein said attachment head of said first clamping arm includes an aperture sized to rotatably engage said first pin, and wherein said attachment head of second clamping arm includes an aperture sized to rotatably engage said second pin.

5. The cover assembly according to claim 1, further comprising at least one anti-rotation block secured to said inner surface of said cover plate and positioned to engage said fitting when said cover plate is located thereon thereby limiting rotation of said cover plate with respect to said fitting.

6. The cover assembly according to claim 1, wherein said elongated notch is formed with a Z-shaped configuration, and wherein said central receiving portion communicates with said first and second receiving portions.

7. The cover assembly according to claim 1, wherein said central receiving portion and said slide block are substantially rectangular.

8. The cover assembly according to claim 1, wherein said attachment head of said first clamping arm includes an outer contact surface sized to engage an edge of said first receiving portion as said slide block is moved from said unlocking position to said locking position whereby said head of said first arm is drawn into said first receiving portion thereby causing rotation of said first clamping arm from said open position to said closed position, and wherein said attachment head of said second clamping arm includes an outer contact surface sized to engage an edge of said second receiving portion as said slide block is moved from said unlocking position to said locking position whereby said head of said second arm is drawn into said second receiving portion thereby causing rotation of said second clamping arm from said open position to said closed position.

9. The cover assembly according to claim 1, wherein said inner surface of said cover plate includes a groove extending about the periphery thereof; and further comprising a sealing ring sized for receipt within said groove whereby a watertight seal is formed between said cover plate and said socket when said clamping arms are rotated from said open position to said closed position.

10. The cover assembly according to claim 1, further comprising mechanical hardware extending through said cover plate to rotatably secure said turning head to said slide block.

11. The cover assembly according to claim 10, wherein said turning head is provided on said hardware.

12. The cover assembly according to claim 11, wherein said mechanical hardware includes a bolt extending through said cover plate, and wherein said turning head is located on said bolt.

13. The cover assembly according to claim 1, wherein said clamping arms are formed with a generally arcuate configuration.

14. In combination,
a) a cargo lashing fitting, and
b) a substantially planar cover plate having an inner surface and an outer surface, said inner surface defining an inner side and said outer surface defining an outer side, said inner surface of said plate including an elongated notch, said notch including a central receiving portion, said notch further including first and second receiving portions located on opposing sides of said central receiving portion;

a slide block positioned within said central receiving portion of said notch and movable between an unlocking position and a locking position, said slide block including first and second opposing attachment points, said first attachment point oriented toward said first receiving portion, said second attachment point oriented toward said second receiving portion;

first and second clamping arms located on said inner side of said cover plate, said first clamping arm including an attachment head positioned within said first receiving portion and pivotably connected to said first attachment point, said second clamping arm including an attachment head positioned within said second receiving portion and pivotably connected to said second attachment point, each of said clamping arms being rotatable between an open position which allows location of said cover plate on said fitting and a closed position which secures said cover plate to said fitting; and at least one turning head located on said outer side of said cover plate, said at least one turning head mechanically communicating with said slide block to move said slide block within said elongated notch in a direction perpendicular to said cover plate between said unlocking position and said locking position thereby rotating said clamping arms between said open position and said closed position.

15. The combination according to claim 14, further comprising first and second biasing springs, said first biasing spring cooperating with said first clamping arm to rotate said first clamping arm to said open position when said slide block is in said unlocking position, said second biasing spring cooperating with said second clamping arm to rotate said second clamping arm to said open position when said slide block is in said unlocking position.

16. The combination according to claim 15, wherein said first attachment point includes an aperture positioned within a first side of said slide block, and said second attachment point includes an aperture positioned within a second side of said slide block, and further comprising:
- a first pin for rotably securing said attachment head of said first clamping arm to said first side of said slide block; and
- a second pin for rotably securing said attachment head of second clamping arm to said second side of said slide block.

\* \* \* \* \*